No. 729,795. PATENTED JUNE 2, 1903.
H. G. REIST.
REGULATING DYNAMO ELECTRIC MACHINES.
APPLICATION FILED MAR. 24, 1902.
NO MODEL.
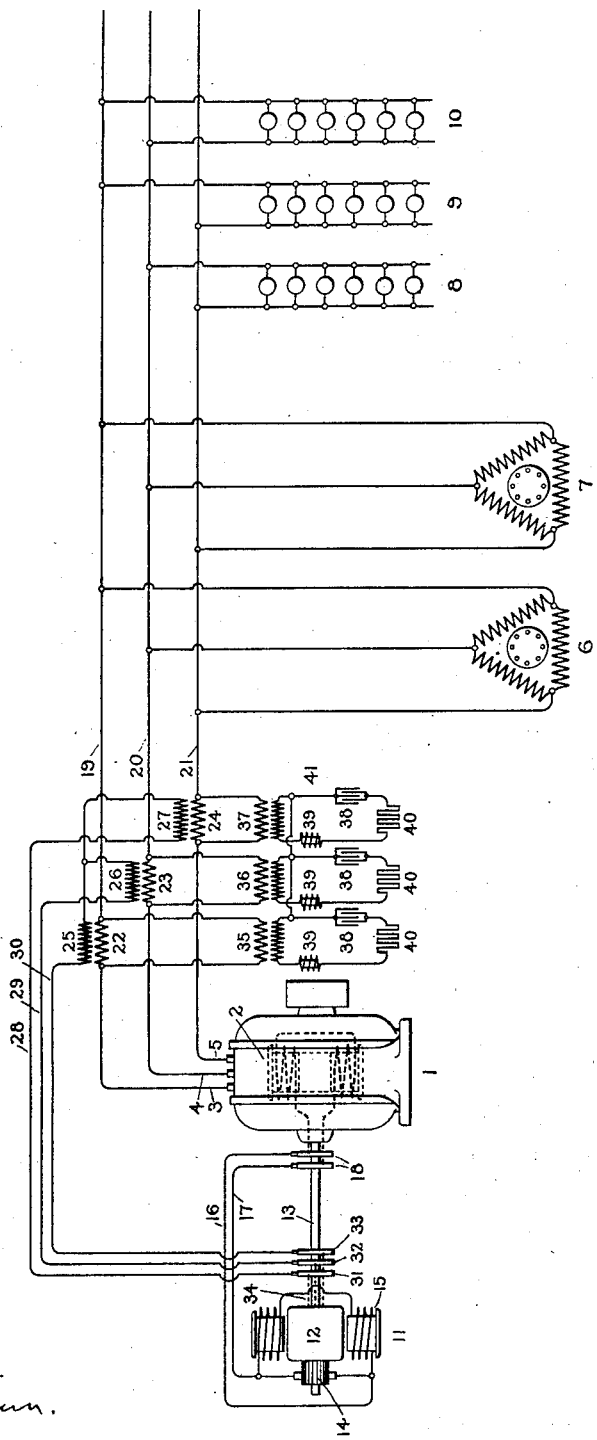
Witnesses.
J. Ellis Glenn.
Helen Orford
Inventor:
Henry G. Reist.
by Albert G. Davis
Atty.

No. 729,795.

Patented June 2, 1903.

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

REGULATING DYNAMO-ELECTRIC MACHINES.

SPECIFICATION forming part of Letters Patent No. 729,795, dated June 2, 1903.

Application filed March 24, 1902. Serial No. 99,590. (No model.)

*To all whom it may concern:*

Be it known that I, HENRY G. REIST, a citizen of the United States, residing at Schenectady, in the county of Schenectady, State of New York, have invented certain new and useful Improvements in Regulating Dynamo-Electric Machines, of which the following is a specification.

My present invention relates to compounding of alternating-current dynamo-electric machines in such a manner as to compensate for the effects of changes in speed.

The invention is particularly useful in connection with that type of alternator now well known to the art as a compensated alternator, wherein alternating current flowing in leads of the machine is conveyed either directly or inductively through the armature of a synchronously-driven exciter, the voltage of which is varied by the armature reaction of this current in such a way as to compensate for the effects of varying power factor of the system to which the alternator is connected.

An alternator of the type mentioned while possessing the features of automatic regulation, as specified, is sensitive to changes in speed, and to overcome the effect of these changes in speed is the purpose of the present invention, the novel features of which I have pointed out in the appended claims and set forth in the following description, which is to be taken in connection with the accompanying somewhat diagrammatic drawing, which shows an embodiment of the invention.

At 1 is represented the main alternator, which in this case consists of an internal revolving field (indicated by the dotted lines at 2) and an external stationary member carrying the main windings, in this instance of the three-phase type, the terminals of which are indicated at 3, 4, and 5. These terminals convey current either directly, as shown, or, if desired, through the interposition of transformers, to translating devices of any desired character. As typical of such translating devices I have represented motors 6 7 and banks of lights 8 9 10 as connected to the mains leading from the terminals of the machine; but it is of course to be understood that any other current-consuming devices or means may be employed, if desired.

The exciter 11 for the main alternator 1 is represented as having its armature 12 mounted directly on the shaft 13 of the alternator; but, if desired, it is evident that it might be geared thereto or otherwise driven in synchronism with the rotating member of the main alternator. This exciter does not differ essentially in structure from ordinary exciters and is provided, as indicated, with the usual commutator 14, connected in the usual manner with the winding of the armature 12 and with a field-magnet structure 15, having a winding in shunt to the commutator. A suitable field-rheostat may of course be employed in connection with this winding; but details of this character it is believed unnecessary to show in the drawing. The terminals of the exciter are connected through leads 16 17 with collector-rings 18, mounted on the shaft 13, which collector-rings convey the exciting-current for the revolving field member 2 of the main alternator.

To render the exciter responsive to variations in load and power factor of the current in the mains 19, 20, and 21 of the distribution system, I provide each main with a series transformer, the primary of the transformer in each instance being connected in series with the main with which it is associated. Thus at 22, 23, and 24 are indicated the primaries of the three series transformers associated, respectively, with the mains 19, 20, and 21. The secondaries 25, 26, and 27 of these transformers are connected in three-phase relation to each other, the connection in this case being the ordinary Y connection, and the three terminals 28, 29, and 30 are connected through leads, as shown, with three collector-rings 31, 32, and 33, mounted on the shaft 13 of the main alternator and connected by taps (indicated in dotted lines at 34) in three-phase relation to the winding of the armature 12.

The arrangement as thus far described is well known in the art, and the mode of regulation of the same is well understood, so that no detailed description of the same seems necessary in the present case. This regulation, however, does not compensate for changes in speed of the alternator 1, to correct which deficiency I make use of the following arrangement: Around the primary of each of the series transformers I shunt a circuit containing reactances of opposite sign—such, for example, as an inductance-coil and a condenser. Since the drop of potential across the terminals of the primary of each series transformer is necessarily small, I connect the several circuits containing reactances of different sign not directly in shunt across the terminals mentioned, but indirectly through a step-up transformer, the use of which enables me to obtain the same capacity effect of a condenser by the use of a much smaller condenser than would be necessary if this indirect connection were omitted and the desired connections made directly. Thus at 35, 36, and 37 are represented the step-up transformers connected, respectively, about the primaries 22, 23, and 24 of the transformers in series with the alternating-current mains 19, 20, and 21. In series with the secondary of each of these step-up transformers are a condenser, an inductance-coil, and a resistance, as indicated, respectively, at 38, 39, and 40 in the secondary of the step-up transformer 35, for example. The remaining step-up transformers are similarly provided with condensers, inductances, and resistances. The condenser and inductance in each of the secondaries mentioned are tuned or proportioned relatively to each other so that their electromotive forces counterbalance each other when current of the normal frequency flows in the mains of the distribution system. The resistance in series with each combination of capacity and inductance serves to limit and to adjust the amount of current flowing in the secondary of each step-up transformer. To overcome a dissymmetry of voltages and currents which may occur in practice, I find it effectual to interconnect the high-tension sides of the step-up transformers in Y, as indicated at 41.

In explaining the operation of the mechanism above described it will be noted that when current flows in the mains of the distribution system it divides, the major part passing through the primaries 22, 23, and 24 of the series transformers and the remaining or branch currents through the circuits feeding the step-up transformers from which the resistance, inductance, and capacity combinations are fed. In case of a variation in frequency of the main current of the alternator, which corresponds of course to an alteration in speed of the alternator, the reactive effects of the inductance-coil and condenser of each combination change accordingly. Thus if the speed of the alternator rises, and consequently the frequency of current in the mains increases, the reactive effect of the inductance-coils increases, while that of the condensers decreases. The branch circuits supplying the step-up transformers therefore carry a lagging current, the effect of which is to cause a phase advancement of the currents in the primaries of the series transformers, which phase advancement is communicated through the secondaries of these transformers to the winding of the armature of the exciter. The polar line of the armature reaction due to the alternating current thus fed into the armature is shifted, so as to decrease the strength of field of the exciter, thereby compensating for the increase of voltage of the exciter which would otherwise exist due to increased speed of driving. In a similar manner a decrease in speed of the main alternator operates to produce a preponderating effect of the condensers in the secondaries of the step-up transformers 35, 36, and 37, the primary circuits of which therefore carry a leading current. The resulting action is therefore equivalent to shunting a condenser about the primaries of each of the series transformers, the effect of which is to cause a retardation or lag of current in these primaries, which retardation or lag is transmitted through the secondaries of these transformers to the exciter-armature 12 in the manner already set forth. In this case the polar line of the armature reaction is shifted in a direction opposite from that first mentioned, and thereby operates to strengthen the field of the exciter, thus compensating for the decrease in voltage which would otherwise take place by reason of the drop in speed of rotation of the armature.

What I claim as new, and desire to secure by Letters Patent of the United States, is—

1. The combination of an alternator, a synchronously-driven exciter, means for conveying to the armature of the exciter a part of the current of said alternator, and means responsive to variations in speed of said alternator for causing a variation in phase of the current thus conveyed to the exciter relatively to the main current of the alternator.

2. The combination of an alternator, a synchronously-driven exciter, series transformers in leads of said alternator, connections between the secondaries of said transformers and the armature of said exciter, and shunt-circuits about the primaries of said series transformers, said shunt-circuits each carrying a leading current when the speed of said alternator is below normal, and a lagging current when the speed of said alternator is higher than normal.

3. The combination of a dynamo-electric machine, an exciter therefor, a tuned circuit fed with current from said dynamo-electric machine, and means operatively related to said tuned circuit for regulating said exciter in response to variation in speed of said dynamo-electric machine.

4. The combination of an alternating-current dynamo-electric machine, a tuned circuit supplied therefrom, and means operatively related to said tuned circuit for regulating said dynamo-electric machine in response to changes of frequency of current supplied to said tuned circuit.

5. The combination of an alternating-current dynamo-electric machine, a circuit containing reactances of opposite sign, means for supplying said circuit with current from said dynamo-electric machine, and means responsive to the phase of current in said circuit for regulating said dynamo-electric machine.

6. The combination of an alternating-current dynamo-electric machine, an exciter therefor, a series transformer in a lead of said dynamo-electric machine, a circuit containing resistance, self-induction and capacity supplied with current from connections across the primary of said transformer, and connections between the secondary of said transformer and the armature of said exciter.

7. The combination of an alternating-current dynamo-electric machine, and means for regulating the field of said machine responsive to variation of load, variation of power factor and variation of speed.

8. The combination of an alternating-current dynamo-electric machine, and means for regulating said machine responsive to variation of frequency and power factor of the main current flowing from said machine.

In witness whereof I have hereunto set my hand this 21st day of March, 1902.

HENRY G. REIST.

Witnesses:
   BENJAMIN B. HULL,
   HELEN ORFORD.